United States Patent
Zhu et al.

(10) Patent No.: US 11,375,868 B2
(45) Date of Patent: Jul. 5, 2022

(54) MULTIFUNCTIONAL WATER SPRAY MOP

(71) Applicant: JIAXING JACKSON TRAVEL PRODUCTS CO., LTD, Zhejiang (CN)

(72) Inventors: Xuelin Zhu, Zhejiang (CN); Dongliang Sheng, Zhejiang (CN); Jing Li, Zhejiang (CN); Min He, Zhejiang (CN); Jian Wu, Zhejiang (CN)

(73) Assignee: JIAXING JACKSON TRAVEL PRODUCTS CO., LTD.

( * ) Notice: Subject to any disclaimer, the term of this patent is extended or adjusted under 35 U.S.C. 154(b) by 590 days.

(21) Appl. No.: 15/750,985

(22) PCT Filed: Nov. 30, 2015

(86) PCT No.: PCT/CN2015/096019
§ 371 (c)(1),
(2) Date: May 26, 2020

(87) PCT Pub. No.: WO2016/192343
PCT Pub. Date: Dec. 8, 2016

(65) Prior Publication Data
US 2020/0281434 A1    Sep. 10, 2020

(30) Foreign Application Priority Data
Jun. 1, 2015    (CN) .......................... 201520366150.4

(51) Int. Cl.
*A47L 13/20* (2006.01)
*A47L 13/22* (2006.01)
*B60S 1/52* (2006.01)

(52) U.S. Cl.
CPC ............... *A47L 13/22* (2013.01); *A47L 13/20* (2013.01); *B60S 1/52* (2013.01)

(58) Field of Classification Search
CPC ........... A47L 13/26; A47L 13/22; A47L 13/20
See application file for complete search history.

(56) References Cited

U.S. PATENT DOCUMENTS

2003/0209263 A1* 11/2003 Bell ........................ A47L 13/22
134/187
2012/0255138 A1* 10/2012 Dingert ................... A47L 13/22
15/228

* cited by examiner

*Primary Examiner* — Michael D Jennings

(57) ABSTRACT

Disclosed is a multifunctional water spray mop, which comprises a mop rod, a water spray mechanism arranged on the mop rod, and a mop head arranged at the tail end of the mop rod. The water spray mechanism comprises a water tank, a pump body in communication with the water tank, and a nozzle in communication with the pump body. The water spray mechanism is detachably arranged on the mop rod. The water spray mechanism is further provided with a connecting component used for connecting other cleaning components, and a press mechanism used for manually operating the pump body to spray a liquid in the pump body out of the nozzle.

15 Claims, 6 Drawing Sheets

MULTIFUNCTIONAL WATER SPRAY MOP

TECHNICAL FIELD OF THE INVENTION

The present invention relates to a water spray mop.

BACKGROUND OF THE INVENTION

The water spray mechanism of the traditional water spray mop is usually fixed on the mop rod. In such a design, the water spray mechanism merely functions with the water spray mop, and cannot be dismounted to be used in conjunction with other cleaning components. Moreover, as the traditional window wiper is not equipped with a water spray mechanism, water needs to be sprayed on the glass first before using the window wiper for a cleaning work. The function of the water spray mechanism can be further enriched if it can be used with other cleaning components such as a window wiper.

SUMMARY OF THE INVENTION

The purpose of the present invention is to solve the shortcomings in the prior art by providing a multifunctional water spray mop having a water spray mechanism capable of being dismounted and used in conjunction with a window wiper.

To achieve the above purpose, the present invention adopts the following technical solution:

A multifunctional water spray mop comprising a mop rod, a water spray mechanism arranged on the mop rod, and a mop head arranged at the tail end of the mop rod; the water spray mechanism comprises a water tank, a pump body in communication with the water tank, and a nozzle in communication with the pump body; the water spray mechanism is detachably arranged on the mop rod; the water spray mechanism is further provided with a connecting component used for connecting a window wiper, and a press mechanism used for manually operating the pump body so as to spray a liquid in the pump body out of the nozzle.

In another aspect of the present invention, the multifunctional water spray mop further comprises a window wiper, which can be connected to the connecting component after the water spray mechanism is dismounted from the mop rod.

In another aspect of the present invention, the nozzle is capable of spraying liquid towards the connecting component.

In another aspect of the present invention, the pump body further comprises a pump case and a piston. One end of the pump case extends into the water tank and is communicated with the water tank. A first one-way valve that merely allows water to flow into the pump case from the water tank is arranged in the pump case. The piston is inserted into the pump case from the other end of the pump case, and is sealed with the pump case. The piston is provided with an elastic member capable of enabling the piston to reset after moving. The nozzle is communicated with the pump case through a water outlet pipeline. A second one-way valve that merely allows water to flow into the water outlet pipeline from the pump case is arranged in the water outlet pipeline.

In another aspect of the present invention, the piston and the nozzle are connected into one body through a water pipe, and the water outlet pipeline is formed within the water pipe.

In another aspect of the present invention, the mop rod comprises an upper rod and a lower rod that are connected in a sleeved mode. The pump body is arranged in a shell, and the shell is detachably arranged on the upper rod.

In another aspect of the present invention, a top block is arranged on the lower rod, and the top block extends into the shell. The water pipe abuts against the top block.

In another aspect of the present invention, the press mechanism is a spanner hinged with the shell, and the spanner is provided with a hook arm. The tail end of the hook arm is provided with a clamping hook. A convex column is arranged on the water pipe, and the convex column is hooked by the clamping hook. The convex column can be propelled to rotate through pressing the spanner, and the piston can be propelled to move towards the interior of the pump case through the clamping hook.

In another aspect of the present invention, the pump case is provided with a flexible straw in communication with the pump case. The flexible straw extends into the water tank. A water suction head is arranged at the tail end of the flexible straw, and the water suction head can reach the bottom of the water tank.

In another aspect of the present invention, a clamping sleeve is sleeved on the upper rod, and a clamping block is arranged on the clamping sleeve. The upper end and the lower end of the outer edge of the clamping block respectively extend to form an upper clamping head and a lower clamping head. A bayonet is formed on the shell, and the bayonet comprises a clamping portion having a wide axial width and a locking portion having a narrow axial width. The clamping portion is communicated with the locking portion. The clamping block is clamped into the bayonet from the clamping portion. After the clamping sleeve rotates by an angle, the clamping block is clamped into the locking portion, and the upper clamping head and the lower clamping head are located behind the locking portion.

In another aspect of the present invention, an auxiliary clamping sleeve is sleeved on the upper rod, and an auxiliary clamping block is arranged on the auxiliary clamping sleeve. An auxiliary bayonet is formed on the shell, and the auxiliary clamping block is clamped into the auxiliary bayonet.

In another aspect of the present invention, the connecting component is a connecting sleeve arranged at the lower end of the shell.

When used as a water spray mop, the design of the present invention is similar to the prior art, which is briefly described herein. After being dismounted from the water spray mop, the water spray mechanism can be connected to a window wiper through the connecting component. The liquid can be sprayed towards the connecting component from the nozzle of the water spray mechanism, namely, sprayed towards the window wiper and the glass surface that needs to be cleaned. It's unnecessary to spray water before cleaning. Thus, the water can be sprayed while cleaning the glass surface.

Compared with the prior art, the present invention has the following advantages:

According to the present invention, the water spray mechanism can be dismounted to be used in conjunction with other cleaning components, thereby further enriching the function of the water spray mechanism, and also enabling the cleaning components to be easier to operate during the cleaning operation.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

DETAILED DESCRIPTION OF THE INVENTION

Figure 1:
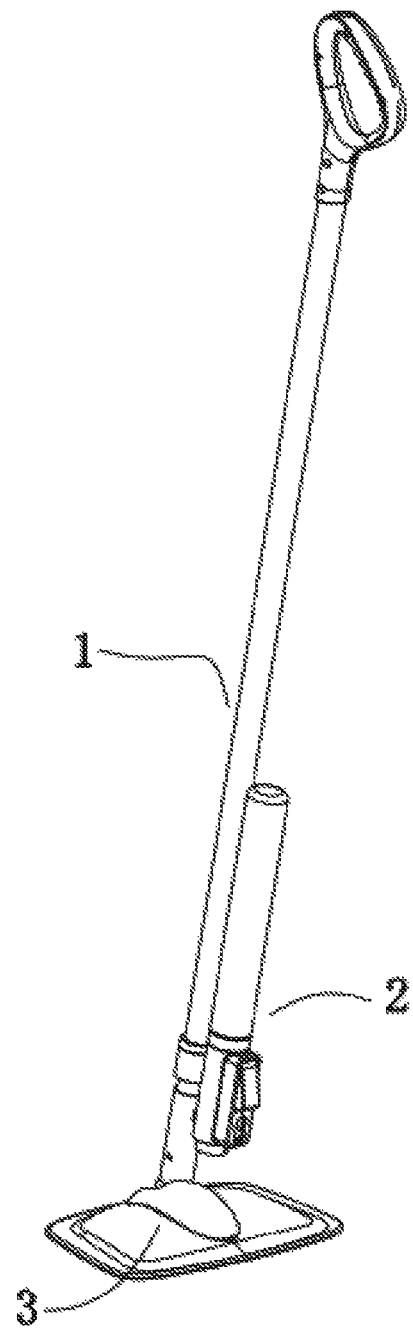
FIG. 1 is a structural diagram of the present invention.
Figure 2:
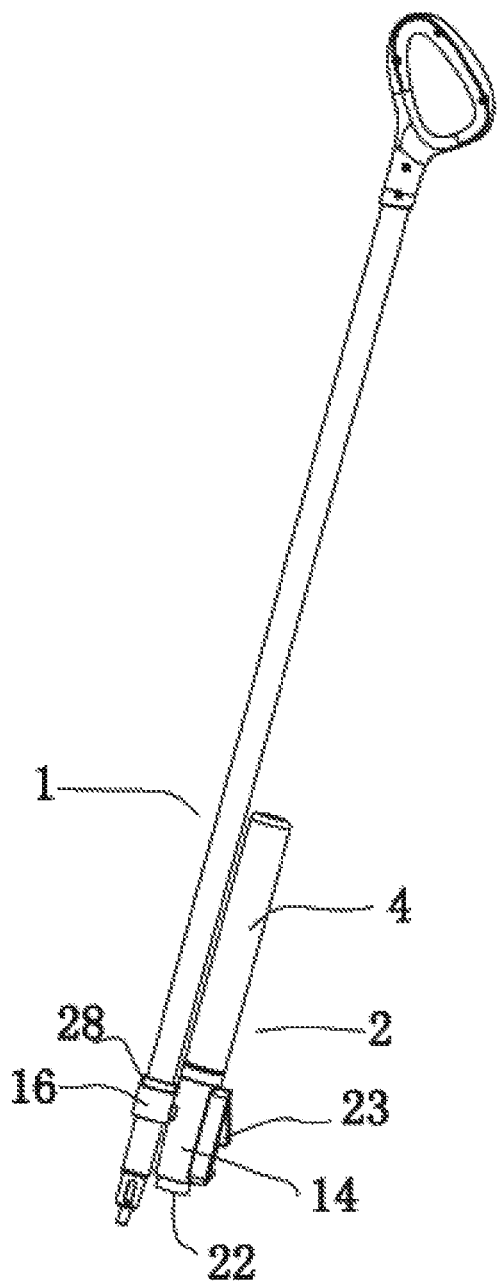
FIG. 2 is a schematic diagram showing the connection between the water spray mechanism and the mop rod.
Figure 3:
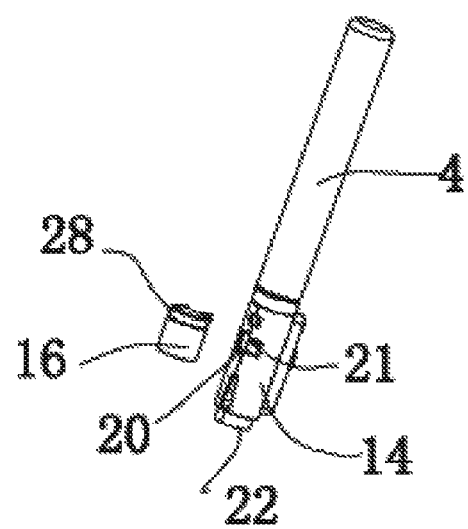
FIG. 3 is an installation schematic diagram of the water spray mechanism of the present invention.
Figure 4:
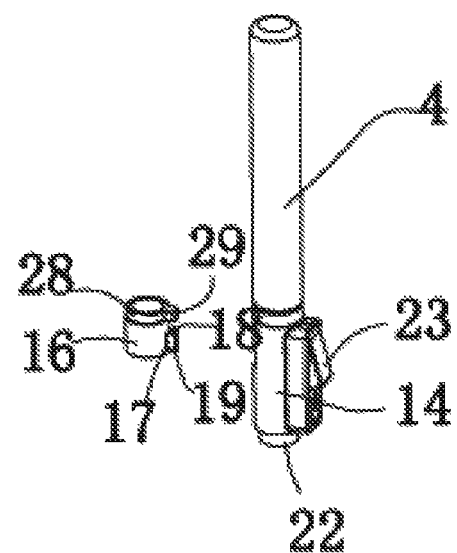
FIG. 4 is an installation schematic diagram of the water spray mechanism of the present invention from another viewing angle.
Figure 5:
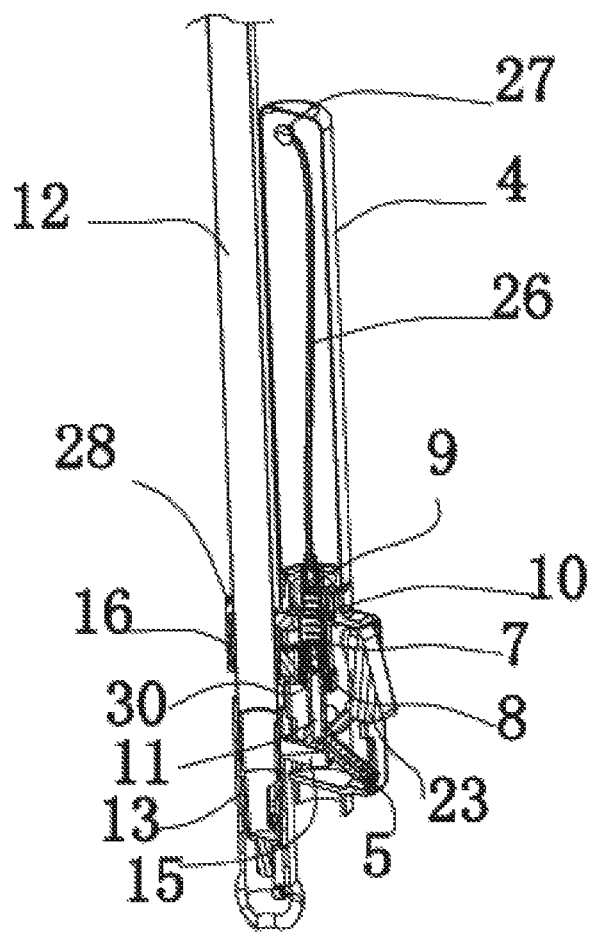
FIG. 5 is a sectional view of the present invention.

Drawings and detailed embodiments are combined hereinafter to elaborate the technical principles of the present invention.

As shown in FIGS. 1-5, the multifunctional water spray mop comprises a mop rod 1, a water spray mechanism 2 arranged on the mop rod 1, and a mop head 3 arranged at the tail end of the mop rod 1. The water spray mechanism 2 comprises a water tank 4, a pump body in communication with the water tank 4, and a nozzle 5 in communication with the pump body.

The water spray mechanism 2 is detachably arranged on the mop rod 1. The water spray mechanism 2 is further provided with a connecting component used for connecting a window wiper, and a press mechanism used for manually operating the pump body so as to spray a liquid in the pump body out of the nozzle 5.

When used as a water spray mop, the using method of the present invention is same as the prior art. After being dismounted from the water spray mop, the water spray mechanism 2 can be connected to a window wiper 6 through the connecting component. The liquid can be sprayed towards the connecting component from the nozzle 5 of the water spray mechanism, namely, sprayed towards the window wiper 6 and the glass surface that needs to be cleaned. Therefore, it's unnecessary to spray water before cleaning, and the water can be sprayed while cleaning the glass surface. Certainly, the direction of the liquid sprayed out of the nozzle 5 is not limited to the direction of the connecting component. In this embodiment, in order to achieve a convenient operation, the nozzle 5 is limited to spray liquid towards the direction of the connecting component, namely, the liquid being directly sprayed to the window wiper. The connecting component can be used in conjunction with other cleaning components.

In this embodiment, the pump body further comprises a pump case 7 and a piston 8. One end of the pump case 7 extends into the water tank 4, and is communicated with the water tank 4. A first one-way valve 9 that merely allows water to flow into the pump case 7 from the water tank 4 is arranged in the pump case 7. The piston 8 is inserted into the pump case 7 from the other end of the pump case 7, and is sealed with the pump case 7. The piston 8 is provided with a spring 10 capable of enabling the piston 8 to reset after moving. The nozzle 5 is communicated with the pump case 7 through a water outlet pipeline. A second one-way valve 30 that merely allows water to flow into the water outlet pipeline from the pump case 7 is arranged in the water outlet pipeline. The piston 8 and the nozzle 5 are connected into one body through a water pipe 11, and the water outlet pipeline is formed within the water pipe 11.

When the present invention is used as a water spray mop, the spraying operation of the water spray mechanism can be achieved through pressing the mop rod. The mop rod comprises an upper rod 12 and a lower rod 13 that are connected in a sleeved mode. The pump body of the water spray mechanism is arranged in a shell 14, and the shell 14 is detachably arranged on the upper rod 12. A top block 15 is arranged on the lower rod 13, and the top block 15 extends into the shell 14. The water pipe 11 abuts against the top block 15. When spraying water, the upper rod 12 is pressed downwards, thereby propelling the whole water spray mechanism to move downwards. At this moment, the top block 15 arranged on the lower rod 13 remains still. Thus, the water pipe 11 of the water spray mechanism is pushed upwards, namely, the piston 8 being pushed upwards. As a result, the volume of the pump case 7 is reduced, and the water in the pump case 7 is sprayed out of the nozzle 5 through the water pipe 11. Furthermore, a third one-way valve capable of limiting the water to flow in one direction can be arranged in the nozzle 5.

When the present invention is used as a water spray mop, the spraying operation of the water spray mechanism can be achieved through other configurations. For instance, in a common water-spraying design of another water spray mop, an operation handle is arranged at the upper end of the mop rod, and the operation handle propels a swing arm to rotate by means of a wire drawing mode, thereby further propelling the piston in the pump body to move. At this moment, the mop rod is no longer an upper rod and a lower rod that are connected in a sleeved mode but a whole rod.

In this embodiment, the water spray mechanism can be detachably connected to the mop rod, wherein a clamping sleeve 16 is sleeved on the upper rod 12, and a clamping block 17 is arranged on the clamping sleeve 16. The upper end and the lower end of the outer edge of the clamping block 17 respectively extend to form an upper clamping head 18 and a lower clamping head 19. A bayonet is formed on the shell 14, and the bayonet comprises a clamping portion 20 having a wide axial width and a locking portion 21 having a narrow axial width. The clamping portion 20 is communicated with the locking portion 21. The clamping block 17 is clamped into the bayonet from the clamping portion 20. After the clamping sleeve 16 rotates by an angle, the clamping block 17 is clamped into the locking portion 21, and the upper clamping head 18 and the lower clamping head 19 are located behind the locking portion 21. When there's a need to remove the water spray mechanism, the clamping sleeve can be reversely rotated so that the water spray mechanism can be conveniently removed. The detachable connection mode of the water spray mechanism is not limited to this embodiment. It can also be realized through other detachable structures. For instance, a pair of clamping arms can be arranged on the upper rod, and the shell of the water spray mechanism is clamped between the clamping arms, etc. In this embodiment, an auxiliary clamping sleeve 28 is sleeved on the upper rod, and an auxiliary clamping block 29 is arranged on the auxiliary clamping sleeve 28. An auxiliary bayonet is formed on the shell, and the auxiliary clamping block is clamped into the auxiliary bayonet. Thus, the positioning of the water spray mechanism can be more stable.

Figure 6:
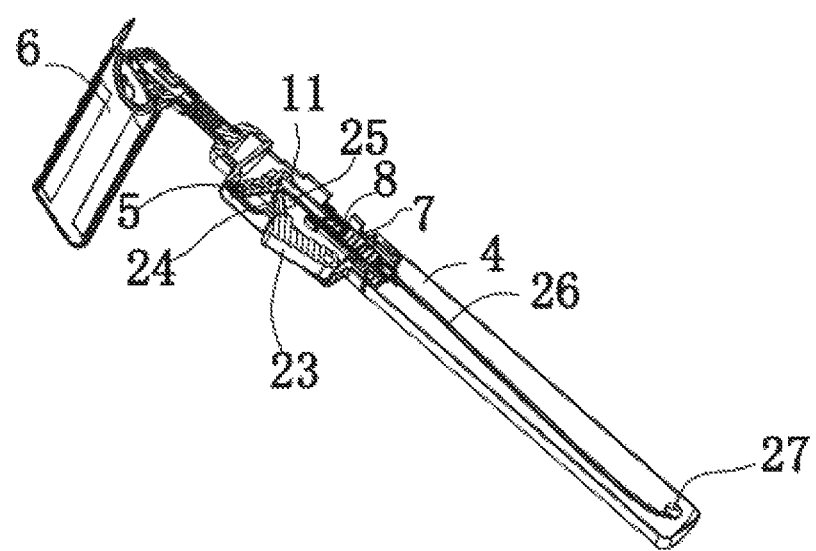
FIG. 6 is a schematic diagram of the water spray mechanism matching with the window wiper.

As shown in FIG. 6, the water spray mechanism is dismounted from the mop rod first, and then the window wiper 6 is connected to the water spray mechanism through the connecting component. Subsequently, the water in the pump body can be pressed into the nozzle 5 by operating the press mechanism. In this embodiment, the connecting component is a connecting sleeve 22 arranged at the lower end of the shell 14. A fastening sleeve is arranged on the window wiper 6, and the fastening sleeve is be tightly sleeved on the connecting sleeve 22. Thus, the window wiper can be easily connected to the water spray mechanism. The window wiper and the water spray mechanism can be connected through other means such as a threaded connection. In this embodiment, the press mechanism is a spanner 23 hinged with the shell 14, and the spanner 23 is provided with a hook arm 24. The tail end of the hook arm 24 is provided with a clamping hook. A convex column 25 is arranged on the water pipe 11, and the convex column is hooked by the clamping hook 25. The convex column 25 can be propelled to rotate through pressing the spanner 23, and the water pipe 11 and the piston 8 can be propelled to move towards the interior of the pump case 7 through the clamping hook. Thus, the volume of the pump case is reduced, enabling the water in the pump case 7 to be sprayed out of the nozzle 5 through the water pipe 11.

As shown in FIG. 6, when the water spray mechanism is used in conjunction with the window wiper, the window wiper is located above the water spray mechanism, and the water spray mechanism is partially used as a handle. At this moment, it's difficult for water in the water tank 4 to enter into the pump body if the water tank 4 is not fully filled with water. Therefore, in this embodiment, the pump case 7 is provided with a flexible straw 26 in communication with the pump case 7. The flexible straw 26 extends into the water tank 4. A water suction head 27 is arranged at the tail end of the flexible straw 26, and the water suction head 27 can reach the bottom of the water tank 26. When the water spray mechanism is partially used as a handle, the pump case 7 is communicated with the water in the water tank. The operating principle of the flexible straw and the water suction head is same as that of the water suction pipe/water suction head adopted in the milk bottle.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:
1. A multifunctional water spray mop, comprising:
a mop rod,
a water spray mechanism arranged on the mop rod, and
a mop head arranged at the tail end of the mop rod,
wherein the water spray mechanism further comprising a water tank, a press mechanism, a connecting component, a pump body in communication with the water tank, and a nozzle in communication with the pump body, wherein the water spray mechanism is detachably arranged on the mop rod, and wherein the press mechanism is capable of spraying liquid in the pump body out of the nozzle, wherein the connecting component is capable of connecting a window wiper to the water spraying mechanism after the water spraying mechanism is detached from the mop rod.

2. The multifunctional water spray mop of claim 1, wherein the nozzle is capable of spraying liquid towards the connecting component.

3. The multifunctional water spray mop of claim 1, wherein the pump body further comprises a pump case and a piston, wherein one end of the pump case extends into the water tank, and is communicated with the water tank, wherein a first one-way valve that merely allows water to flow into the pump case from the water tank is arranged in the pump case, wherein the piston is inserted into the pump case from the other end of the pump case, and is sealed with the pump case,
wherein the piston is provided with an elastic member capable of enabling the piston to reset after moving, wherein the nozzle is communicated with the pump case through a water outlet pipeline, wherein a second one-way valve that merely allows water to flow into the water outlet pipeline from the pump case is arranged in the water outlet pipeline.

4. The multifunctional water spray mop of claim 3, wherein the piston and the nozzle are connected into one body through a water pipe, and the water outlet pipeline is formed within the water pipe.

5. The multifunctional water spray mop of claim 4, wherein the mop rod comprises an upper rod and a lower rod that are connected in a sleeved mode, wherein the pump body is arranged in a shell, wherein the shell is detachably arranged on the upper rod.

6. The multifunctional water spray mop of claim 5, wherein a top block is arranged on the lower rod, and the top block extends into the shell, wherein the water pipe abuts against the top block.

7. The multifunctional water spray mop of claim 6, wherein the pump case is provided with a flexible straw in communication with the pump case, wherein the flexible straw extends into the water tank, wherein a water suction head is arranged at the tail end of the flexible straw, and the water suction head can reach the bottom of the water tank.

8. The multifunctional water spray mop of claim 6, wherein a clamping sleeve is sleeved on the upper rod, and a clamping block is arranged on the clamping sleeve, wherein the upper end and the lower end of the outer edge of the clamping block respectively extend to form an upper clamping head and a lower clamping head, wherein a bayonet is formed on the shell, and the bayonet comprises a clamping portion having a wide axial width and a locking portion having a narrow axial width, wherein the clamping portion is communicated with the locking portion, wherein the clamping block is clamped into the bayonet from the clamping portion, wherein after the clamping sleeve rotates by an angle, the clamping block is clamped into the locking portion, and the upper clamping head and the lower clamping head are located behind the locking portion.

9. The multifunctional water spray mop of claim 5, wherein the press mechanism is a spanner hinged with the shell, and the spanner is provided with a hook arm, wherein the tail end of the hook arm is provided with a clamping hook, wherein a convex column is arranged on the water pipe, and the convex column is hooked by the clamping hook, wherein the convex column can be propelled to rotate through pressing the spanner, and the piston can be propelled to move towards the interior of the pump case through the clamping hook.

10. The multifunctional water spray mop of claim 9, wherein the pump case is provided with a flexible straw in communication with the pump case, wherein the flexible straw extends into the water tank, wherein a water suction head is arranged at the tail end of the flexible straw, and the water suction head can reach the bottom of the water tank.

11. The multifunctional water spray mop of claim 9, wherein a clamping sleeve is sleeved on the upper rod, and a clamping block is arranged on the clamping sleeve, wherein the upper end and the lower end of the outer edge of the clamping block respectively extend to form an upper clamping head and a lower clamping head, wherein a bayonet is formed on the shell, and the bayonet comprises a clamping portion having a wide axial width and a locking portion having a narrow axial width, wherein the clamping portion is communicated with the locking portion, wherein the clamping block is clamped into the bayonet from the clamping portion, wherein after the clamping sleeve rotates by an angle, the clamping block is clamped into the locking portion, and the upper clamping head and the lower clamping head are located behind the locking portion.

12. The multifunctional water spray mop of claim 5, wherein a clamping sleeve is sleeved on the upper rod, and a clamping block is arranged on the clamping sleeve, wherein the upper end and the lower end of the outer edge of the clamping block respectively extend to form an upper clamping head and a lower clamping head, wherein a bayonet is formed on the shell, and the bayonet comprises a clamping portion having a wide axial width and a locking portion having a narrow axial width, wherein the clamping portion is communicated with the locking portion, wherein the clamping block is clamped into the bayonet from the clamping portion, wherein after the clamping sleeve rotates by an angle, the clamping block is clamped into the locking portion, and the upper clamping head and the lower clamping head are located behind the locking portion.

13. The multifunctional water spray mop of claim 5, wherein the pump case is provided with a flexible straw in communication with the pump case, wherein the flexible straw extends into the water tank, wherein a water suction head is arranged at the tail end of the flexible straw, and the water suction head can reach the bottom of the water tank.

14. The multifunctional water spray mop of claim 4, wherein the pump case is provided with a flexible straw in communication with the pump case, wherein the flexible straw extends into the water tank, wherein a water suction head is arranged at the tail end of the flexible straw, and the water suction head can reach the bottom of the water tank.

15. The multifunctional water spray mop of claim 3, wherein the pump case is provided with a flexible straw in communication with the pump case, wherein the flexible straw extends into the water tank, wherein a water suction head is arranged at the tail end of the flexible straw, and the water suction head can reach the bottom of the water tank.

* * * * *